US012451267B2

(12) United States Patent
Raithel et al.

(10) Patent No.: US 12,451,267 B2
(45) Date of Patent: Oct. 21, 2025

(54) TRACTOR ATOM INTERFEROMETRY

(71) Applicant: THE REGENTS OF THE UNIVERSITY OF MICHIGAN, Ann Arbor, MI (US)

(72) Inventors: Georg A. Raithel, Ann Arbor, MI (US); Alisher Duspayev, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 591 days.

(21) Appl. No.: 17/891,673

(22) Filed: Aug. 19, 2022

(65) Prior Publication Data

US 2023/0056032 A1 Feb. 23, 2023

Related U.S. Application Data

(60) Provisional application No. 63/235,209, filed on Aug. 20, 2021.

(51) Int. Cl.
*G21K 1/00* (2006.01)
*G01C 19/58* (2006.01)
*G01P 15/093* (2006.01)

(52) U.S. Cl.
CPC ............. *G21K 1/006* (2013.01); *G01C 19/58* (2013.01); *G01P 15/093* (2013.01)

(58) Field of Classification Search
USPC .......................................................... 250/251
See application file for complete search history.

(56) References Cited

U.S. PATENT DOCUMENTS

| 8,415,612 | B2 * | 4/2013 | McBride | G21K 1/093 |
| | | | | 250/436 |
| 2013/0152680 | A1 * | 6/2013 | Sackett | G01P 15/08 |
| | | | | 73/488 |
| 2024/0134084 | A1 * | 4/2024 | Bongs | G01V 7/00 |

* cited by examiner

*Primary Examiner* — Kiet T Nguyen
(74) *Attorney, Agent, or Firm* — Harness, Dickey & Pierce, P.L.C.

(57) ABSTRACT

A method is presented for measuring motion of a moving body using an atom interferometer. The method includes: positioning at least one atom in a cavity of the atom interferometer, where the atom interferometer is attached to the moving body; splitting the at least one atom into a pair of wave-function components; guiding the pair of wave-function components along respective paths in the cavity such that the pair of wave-function components are confined spatially along the respective paths in all degrees of freedom and without interruption; coherently recombining the pair of wave-function components into the at least one atom; and measuring a property of the at least one atom after the pair of wave-function components have been recombined into the at least one atom, where the property of the at least one atom is indicative of motion of the moving body.

10 Claims, 9 Drawing Sheets

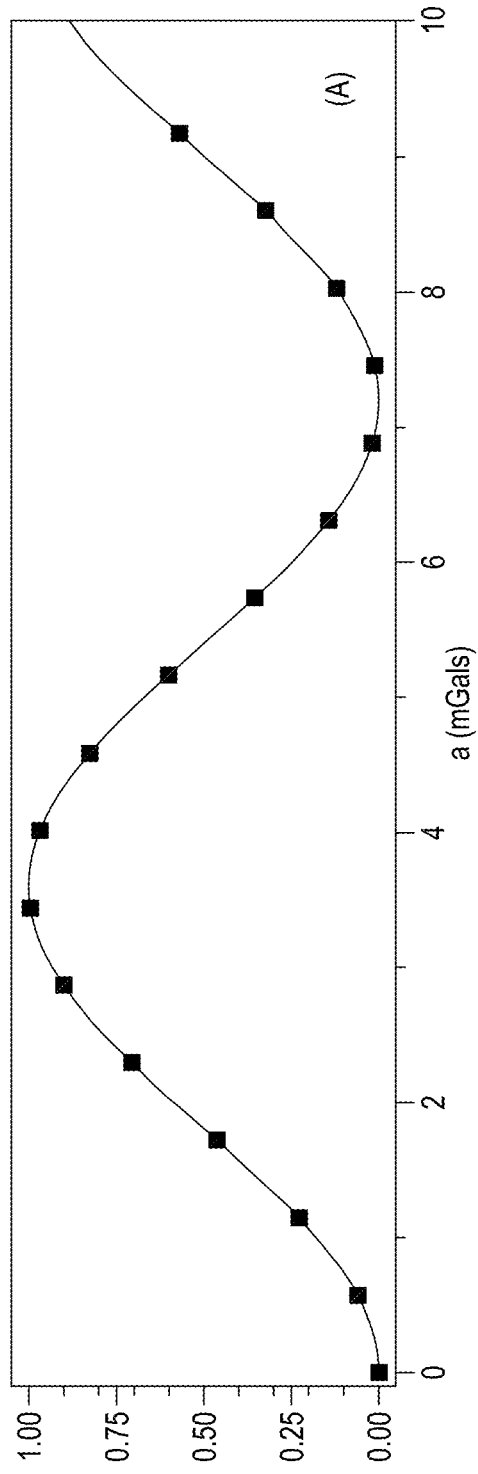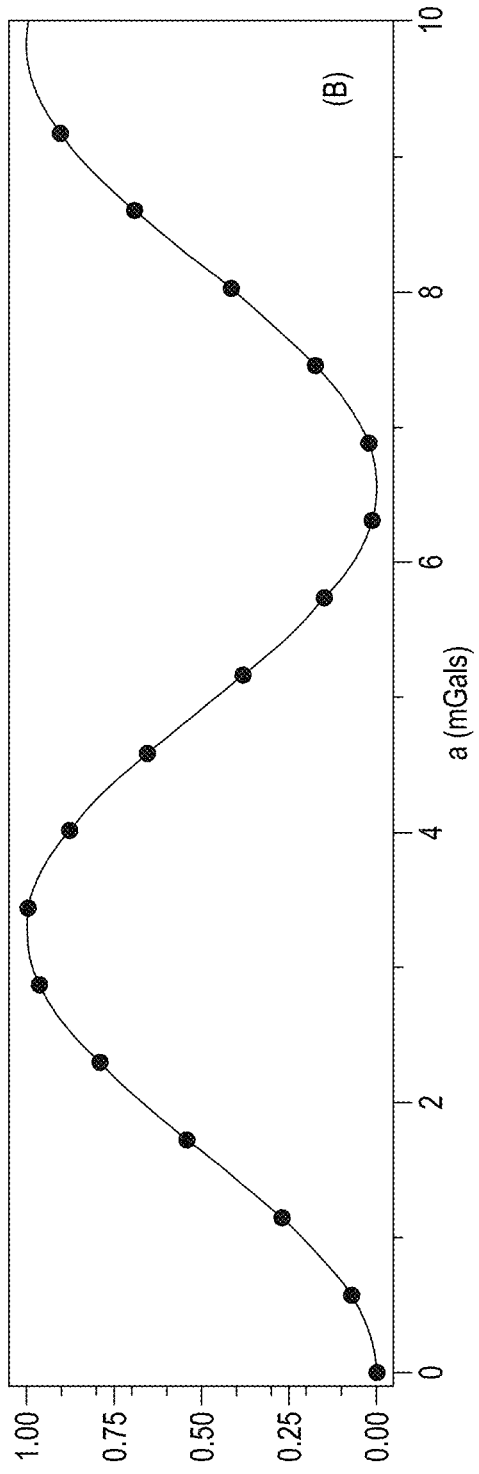
Fig-2A
Fig-2B

Example: Lattice in Hermite-Gaussian $HG_{N=9, M=9}$ mode with azimuthal actuation Cross-sectional xy-plane view

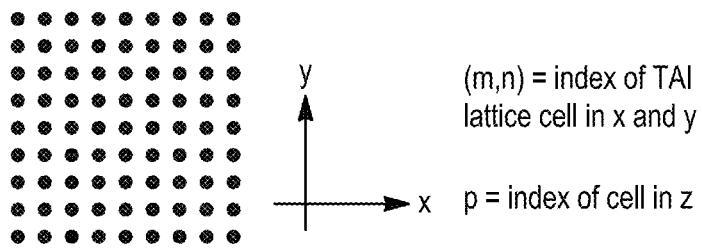

$(m,n)$ = index of TAI lattice cell in x and y
$p$ = index of cell in z

Atom $(m,n,p)=(1,1,1)$

Longitudinal xz-plane view

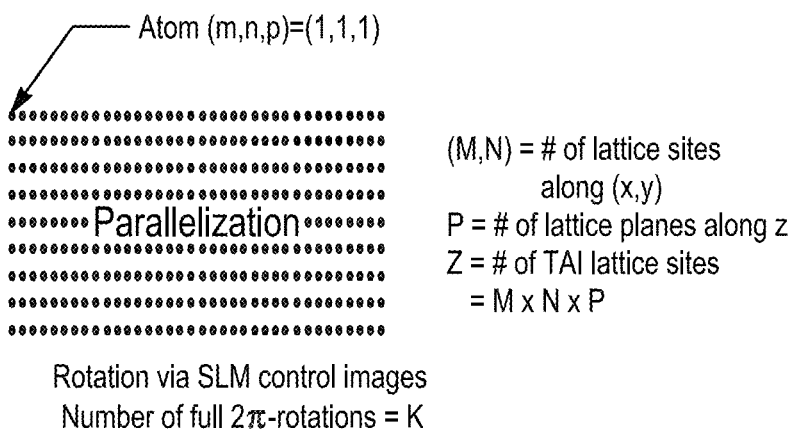

Parallelization $(M,N)$ = # of lattice sites along $(x,y)$
$P$ = # of lattice planes along z
$Z$ = # of TAI lattice sites
  = $M \times N \times P$ Rotation via SLM control images
Number of full $2\pi$-rotations = K

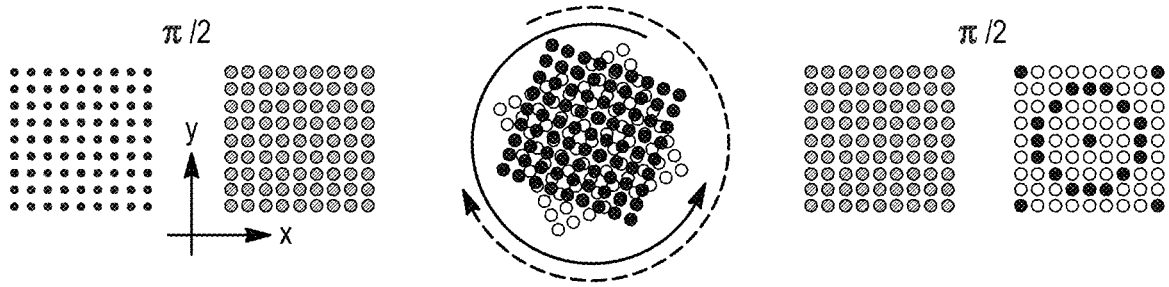

$\pi/2$ ... $\pi/2$

Number of TAI loops in lattice : $Z = M \times N \times P$
State-selective fluorescence readout with noise reduction due to parallelization
The Sagnac area, $K \pi r_{nm}^2$, depends on the site indices n and m, with no significant dependence on the z site index p.
(xy)-resolved and state-selective fluorescence readout results in a radially-dependent interferometric signal that reveals the platform's angular rotation speed in z, without ambiguity.

*Fig-7B*

TRACTOR ATOM INTERFEROMETRY

CROSS-REFERENCE TO RELATED APPLICATIONS

This application claims the benefit of U.S. Provisional Application No. 63/235,209, filed on Aug. 20, 2021. The entire disclosure of the above application is incorporated herein by reference.

This invention was made with government support under PHYS1806809 awarded by the National Science Foundation and under NNN12AA01C awarded by the National Aeronautics and Space Administration. The government has certain rights in the invention.

FIELD

The present disclosure relates to atom interferometers.

BACKGROUND

Since their first demonstrations, atom interferometers (AIs) have become a powerful tool with a broad range of applications in tests of fundamental physics, precision measurements, and applied sciences. A challenge in atom interferometer design is to achieve a high degree of sensitivity with respect to the measured quantity (e.g., an acceleration) while minimizing geometrical footprint of the apparatus and maximizing readout bandwidth to allow for practical applications. Previous work on atom interferometers includes free-space and point-source AI experiments, as well as guided-wave AI experiments and proposals. Free-space and point-source AIs typically employ atomic fountains or dropped atom clouds. The point-source method supports efficient readout and data reduction, enables high bandwidth, and affords efficiency in the partial-fringe regime. Atomic fountains typically employed in free-space atom interferomters maximize interferometric time and hence increase sensitivity but require large experimental setups. Guided-wave AIs offer compactness and are often used as Sagnac rotation sensors but are susceptible to noise in the guiding potentials. In both free-space and guided-wave AI, wave-packet dynamics along unconfined degrees of freedom can cause wave-packet dispersion and failure to close, i.e., the split wave packets may fail to recombine in space-time. Coherent recombination of split atomic wave functions upon their preparation and time evolution remains challenging in recent atom interferometer studies.

In this disclosure, a technique is proposed in which there are no unconfined degrees of freedom of the center-of-mass (COM) motion in the atom interferometer. The method relies on confining, splitting, transporting, and recombining atomic COM quantum states in three-dimensional (3D) quantum wells that move along user-programmed paths. This approach is referred to herein as "tractor atom interferometer" (TAI). Proper tractor path control ensures closure of the interferometer, and tight 3D confinement at all times during the AI loop suppresses coherence loss due to wave-packet dispersion.

This section provides background information related to the present disclosure which is not necessarily prior art.

SUMMARY

This section provides a general summary of the disclosure, and is not a comprehensive disclosure of its full scope or all of its features.

In one aspect, a method is presented for measuring motion of a moving body using an atom interferometer. The method includes: positioning at least one atom in a cavity of the atom interferometer, where the atom interferometer is attached to the moving body; splitting the at least one atom into a pair of wave-function components; guiding the pair of wave-function components along respective paths in the cavity such that the pair of wave-function components are confined spatially along the respective paths in all degrees of freedom and without interruption; coherently recombining the pair of wave-function components into the at least one atom; and measuring a property of the at least one atom after the pair of wave-function components have been recombined into the at least one atom, where the property of the at least one atom is indicative of motion of the moving body.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 2A and 2B are simulated measurements using tractor atom interferometry with scalar and spinor wave functions, respectively.

FIGS. 7A and 7B depicts a second example embodiment for the tractor atom interferometer.

Corresponding reference numerals indicate corresponding parts throughout the several views of the drawings.

DETAILED DESCRIPTION

Example embodiments will now be described more fully with reference to the accompanying drawings.

The quantum state of a single atom in the COM and spin product state space is $$|\psi\rangle = \sum_{i=1}^{i_{max}} |\psi_i(t)\rangle \otimes |i\rangle, \quad (1)$$

with COM components $|\psi_i(t)\rangle$ in a number of spin states $i_{max}$. For simplicity, assume that all elements of the spin-state basis $\{|i\rangle\}$ are position and time independent, and that the x and y degrees of freedom of the COM are frozen out. Denoting $\psi_i(z,t)=\langle z|\psi_i(t)\rangle$, the time-dependent Schrödinger equation becomes $$i\hbar\frac{\partial}{\partial t}\psi_i(z, t) = -\left[\frac{\hbar^2}{2m}\frac{\partial^2}{\partial z^2} + U_i(z, t)\right]\psi_i(z, t) + \sum_{j=1}^{i_{max}} \frac{\hbar\Omega_{ij}(z, t)}{2}\psi_j(z, t), \quad (2)$$

with $i=1, \ldots, i_{max}$, particle mass m, COM potentials $U_i(z, t)$ that may depend on spin, and couplings $\Omega_{ij}(z, t)$ between the spin states.

In the examples below, consider a scalar case, in which $i_{max}=1$, and a spinor case with $i_{max}=2$. In the scalar case, the tractor traps of the atom interferometer are all contained in a single potential $U_1(z, t)$ for a scalar wave function $\psi_1(z, t)$ (and there are no couplings $\Omega_{ij}$). In the spinor case, the spin space can be viewed as that of a spin-1/2 particle with spin states $\{|\uparrow\rangle, |\downarrow\rangle\}$. The spin states could, for instance, represent two magnetic sublevels of the F=1 and F=2 hyperfine ground states of $^{87}$Rb. In spinor TAI, the spin states have distinct potentials, $U_\uparrow(z, t)$ and $U_\downarrow(z, t)$, with spin-specific potential wells, and the spinor wave-function components are coupled via $\Omega_{\downarrow\uparrow}=\Omega^*_{\uparrow\downarrow}$.

Numerically solve equation (2) using the Crank-Nicolson (CN) method. In this example, $^{87}$Rb atoms are used in wells ~20 μm wide and ~h×1 MHz deep. A time-step size of $\Delta t=10$ ns and a spatial grid step size of $\Delta z=10$ nm is used. For the spinor simulations, the Crank-Nicolson is generalized to cover problems with $i_{max}>1$.

Figure 1:
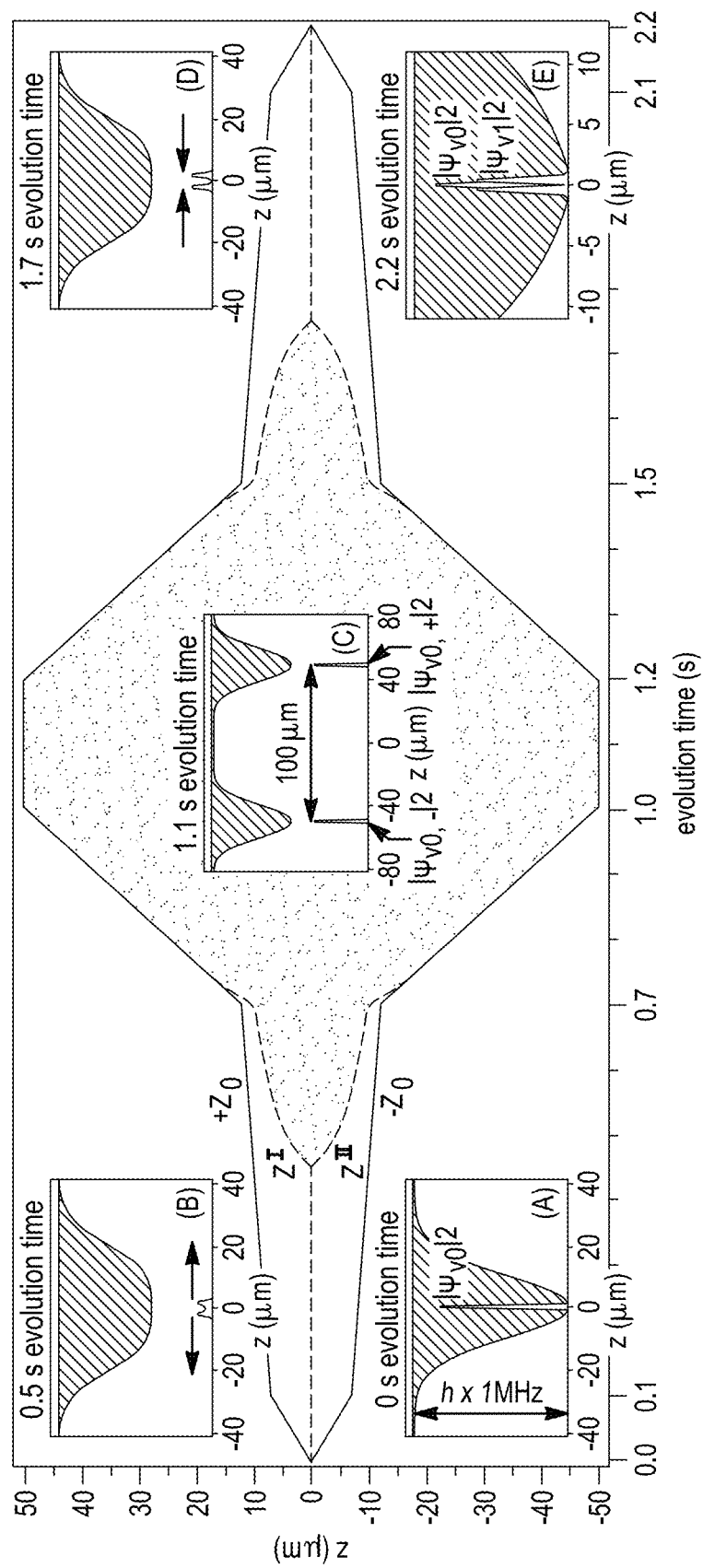
FIG. 1 illustrates an example of a scalar atom interferometer implementation in accordance with this disclosure.

FIG. 1 illustrates an example scalar atom interferometer implementation in accordance with this disclosure. In this scalar implementation, the scalar potential $U_1(z, t)$ is the sum of two identically shaped Gaussian potential wells that are both h×500 kHz deep and have a full-width-at-half-depth (FWHD) of 23.5 μm. The two Gaussians are centered at positions that are chosen to be symmetric in z and are given by programmed tractor control functions $\pm z_0(t)$ (solid lines in FIG. 1). Initially, they are collocated at $z_0=0$ μm, forming a single trap that is h×1 MHz deep. A $^{87}$Rb atom is initialized in its COM ground state, $|\psi v_0\rangle$, of the h×1 MHz-deep well [inset (A) in FIG. 1]. The function $z_0(t)$ is then gradually ramped up in order to split the single initial well into a pair of symmetric wells, causing the wave function to coherently split into two components [inset (B) in FIG. 1]. For $|z_0|\gtrsim 10$ μm, the split wells are about h×500 kHz deep. The minima in $U_1(z, t)$ follow the paths $z'(t)$ and $z''(t)$ shown by dashed lines in FIG. 1, with $z'(t)=-z''(t)$. The paths $z''''(t)$ are found by solving $(\partial/\partial z)U_1(z,t)=0$. After the splitting, tunneling-induced coupling of the wave-function components ceases, and the components adiabatically follow the separated paths of the potential minima. In this example, the wave-function components stay separated for about 1 s, with the separation held constant at a maximum of $2z_0=100$ μm for a duration of 0.2 s [inset (C) in FIG. 1]. The wells and wave-function components in them are recombined in a fashion that mirrors the separation [insets (D) and (E)]. In order to provide a sufficient degree of adiabaticity, the ramp speed of the tractor control functions, $|\dot{z}_0(t)|$, is reduced near the times when the wave function splits and recombines. The total duration of the cycle is 2.2 s, which is in line with the typical operation of modern atom interferometers.

In this scalar implementation, the tractor paths, $z''''(t)$, differ significantly from the tractor control functions, $\pm z_0(t)$, during the well separation and recombination phases, while they are essentially the same when the minima are separated by more than the width of the wells (compare solid and dashed lines in FIG. 1). The atom interferometer area, visualized in FIG. 1 by a gray shading, is the area enclosed by the paths $z'(t)$ and $z''(t)$.

Atom interferometer closure is guaranteed by virtue of proper tractor control. This is evident in the simulated wave-function plots included in FIG. 1. The quantum AI phase, $\Delta\phi_Q$, accumulates in the phases of the complex coefficients of the COM ground states in the split wells at positive and negative z, denoted $|\psi_{v0,\pm}\rangle$ [inset (C) of FIG. 1]. Upon recombination of the pair of wells into a single well [insets (D) and (E) of FIG. 1], the atomic state becomes mapped into a coherent superposition of the lowest and first-excited quantum states of the combined well, $|\psi\rangle=c_{v0}|\psi_{v0}\rangle+c_{v1}|\psi_{v1}\rangle$ [inset (E) of FIG. 1]. The observable probabilities, $|c_{v0}|^2$ and $|c_{v1}|^2$, yield the TAI quantum phase, $\Delta\phi_Q$, via the relation $$\frac{|c_{v1}|^2}{|c_{v0}|^2 + |c_{v1}|^2} = \sin^2\left(\frac{\Delta\phi_Q}{2}\right). \quad (3)$$

Due to uninterrupted 3D confinement, TAI eliminates free-particle wave-packet dispersion. There is, however, a possibility of nonadiabatic transitions into excited COM states during the wave-function splitting and recombination, which would reduce the interferometer's contrast and introduce spurious signals. To show that under conditions, such as in FIG. 1, there is no significant coherence loss due to nonperfect closure or nonadiabatic effects, wave-function simulations were performed for 17 values of a small acceleration, a, along the z direction. The acceleration adds a potential $U_g=m\,a\,z$ to the TAI potential $U_1(z, t)$. Vary a over a range from 0 to 10 mGal ($10^{-4}$ m/s$^2$). From the wave-function simulations, determine $\sin^2(\Delta\phi_Q/2)$ according to equation (3) as a function of a, and plot the results in FIG. 2A (symbols). The visibility of the expected sinusoidal dependence reaches near unity, providing evidence for near-perfect closure and absence of coherence loss due to nonadiabatic COM excitations.

The scalar scheme above serves well to describe the TAI concept. At the splitting, the initial COM state is supposed to evolve into the even-parity superposition of the ground states in the split wells, $(|\psi_{v0,+}\rangle+|\psi_{v0,-}\rangle)/\sqrt{2}$, without populating the odd-parity superposition and other excited COM states. However, under conditions that are less ideal, scalar TAI is prone to nonadiabatic excitation of unwanted COM states at the times when the wells split and recombine. The splitting and, similarly, the recombination are fragile because the potential is very soft at the splitting and recombination times, and nonadiabatic mixing can easily occur.

The fragility of scalar TAI is avoided in a second, improved method that operates on a two-component spinor system [$i_{max}=2$ in Eqs. (1) and (2)] with a pair of spin-dependent potentials. The atomic wave function is initially prepared in the COM ground state $|\psi_{v0,\downarrow}\rangle$ of a spin-down tractor potential [inset (A) in FIG. 3]. With initially overlapping and identical spin-down and spin-up tractor potentials, $U_\downarrow(z, t=0)$ and $U_\uparrow(z, t=0)$, a short π/2 coupling pulse with Rabi frequency $\Omega_{\downarrow\uparrow}$ [see Eq. (2)] prepares a coherent superposition $(|\psi_{v0,\downarrow}\rangle+|\psi_{v0,\uparrow}\rangle)/\sqrt{2}$ of the COM ground states of the potentials $U_\downarrow(z, t=0)$ and $U_\uparrow(z, t=0)$. The π/2 pulse can be realized by a microwave or a momentum-transfer-free optical Raman transition. In the simulated case, the Rabi frequency $\Omega_{\downarrow\uparrow}$ is position-independent, has a fixed magnitude $\Omega_{\downarrow\uparrow}(t)=2\pi\times 178$ kHz, and is on for a coupling-pulse duration of $\Delta t_R=1.4$ μs, which is short on the timescale of the interferometer. The resultant TAI splitting is depicted on the Bloch sphere in the inset (B) of FIG. 3. After the π/2 pulse, the spin-dependent potentials and the spinor wave-function components in them are translated following symmetric tractor control functions $z_{0,\uparrow}(t)=z_0(t)=-z_{0,\downarrow}(t)$. After a holding time of 0.2 s at a maximal separation of 100 µm [inset (C) in FIG. 3], the splitting is reversed and the wave-function components become overlapped again. Closure occurs via an exit $-\pi/2$ pulse [inset (D) in FIG. 3]. In the case of spinor TAI, the tractor paths and control functions are identical, $z'(t)=z_{0,\uparrow}(t)$ and $z''(t)=z_{0,\downarrow}(t)$. The atom interferometer area is visualized by the gray shaded region in FIG. 3.

In the absence of nonadiabatic transitions into excited COM states in the spin-dependent potentials, the final state is of the form $|\psi\rangle=c\downarrow\phi v0, \downarrow\rangle+c\uparrow|\phi v0,\uparrow\rangle$. The AI phase $\Delta\phi_Q$ is encoded in the final populations in the two spin states [inset (E) in FIG. 3] and follows $$\frac{|c_\uparrow|^2}{|c_\downarrow|^2+|c_\uparrow|^2}=\sin^2\left(\frac{\Delta\phi_Q}{2}\right). \quad (4)$$

In experimental implementations, the $|c_\downarrow|^2$ and $|c_\uparrow|^2$ can be measured, for instance, via state-dependent fluorescence to yield $$\sin^2\left(\frac{\Delta\phi_Q}{2}\right).$$

Similar to the scalar case, wave-function simulations were performed for a set of accelerations a along the z direction, which add identical gravitational potentials $U_g$=maz to both spin-dependent potentials. From the simulated spinor wave functions, extract $c_\uparrow$ and $c_\downarrow$, compute $\sin^2(\Delta\phi_Q/2)$ according to equation (4), and plot the results in FIG. 2B (symbols). The results again provide evidence for near-perfect closure and absence of coherence loss due to nonadiabatic COM transitions.

Using the path-integral formalism, the semiclassical phase of an AI loop, $\Delta\phi_S$, in one dimension is $$\Delta\phi_S = \frac{\int_{t_a}^{t_b}[\mathcal{L}^{II}(z,\dot{z},t)-\mathcal{L}^{I}(z,\dot{z},t)]dt}{\hbar}. \quad (5)$$

where $\Delta\phi$ is in rads, $L^{I/II}$ are the Lagrange functions on the paths $z^{I/II}(t)$ of the centroids of the split atomic wave-function components, and $t_a$ and $t_b$ are the splitting and recombination times.

A key feature that distinguishes TAI from other atom interferometers is that the paths $z^{I/II}(t)$ are predetermined by the system controls and therefore do not have to be computed prior to using equation (5). Simultaneous arrival of the split wave-function components at the recombination point is achieved by proper programming of the tractor paths.

The guaranteed closure of TAI in space-time is related to the fact that the number of generalized Lagrangian coordinates in TAI is zero. Other atom interferometers typically have at least one generalized coordinate along which the classical motion is unconstrained and along which quantum wave packets may disperse. The atom interferometer can then, in principle, fail to achieve closure due to a difference in classical propagation times along the AI paths between splitting and recombination. A propagation time difference can be caused by uncontrollable conditions, such as an erratic background acceleration. In TAI, closure is guaranteed by virtue of uninterrupted 3D control of the interferometric paths and suitable tractor programming.

In these examples, tractor paths are considered in which the kinetic energy terms in $\mathcal{L}^{I/II}$ are equal, i.e., $\dot{z}''(t)=-\dot{z}'(t)$, and have added a gravitational potential $U_g$=maz. In that case, equation (5) simplifies to $$\Delta\phi_S = \frac{\int_{t_a}^{t_b}[U_g(z^I(t))-U_g(z^{II}(t))]dt}{\hbar}=\frac{maC}{\hbar} \quad (6)$$

with a parameter $$C=\int_{t_a}^{t_b}[z'(t)-z''(t)]dt \quad (7)$$

that only depends on the programmed tractor paths $z'(t)$ and $z''(t)$. Note there is no atom dynamics to be solved for. The $z'(t)$ and $z''(t)$ are either identical with the tractor control functions $z_{0,*}(t)$ themselves (spinor case), or they are found by solving an equation of the type $(\partial/\partial z)U_1(z,t)=0$ (scalar case).

The semiclassical phases $\Delta\phi_S$ are compared with the quantum phases $\Delta\phi_Q$ over a range of accelerations, a. The $\Delta\phi_S(a)$ that follow from equations (5)-(7) after utilization of the appropriate tractor paths $z'(t)$ and $z''(t)$ are shown in FIGS. 2A and 2B as solid lines. In both cases one finds that $\Delta\phi_S=\Delta\phi_Q$, with minor discrepancies that are not visible in the figure. Quantum and semiclassical phases are both offset-free, i.e., in the case of symmetric controls and for a=0 it is $\Delta\phi_S=\Delta\phi_Q=0$. This indicates that the exact quantum dynamics does not add an offset splitting and recombination phase.

Figure 3:
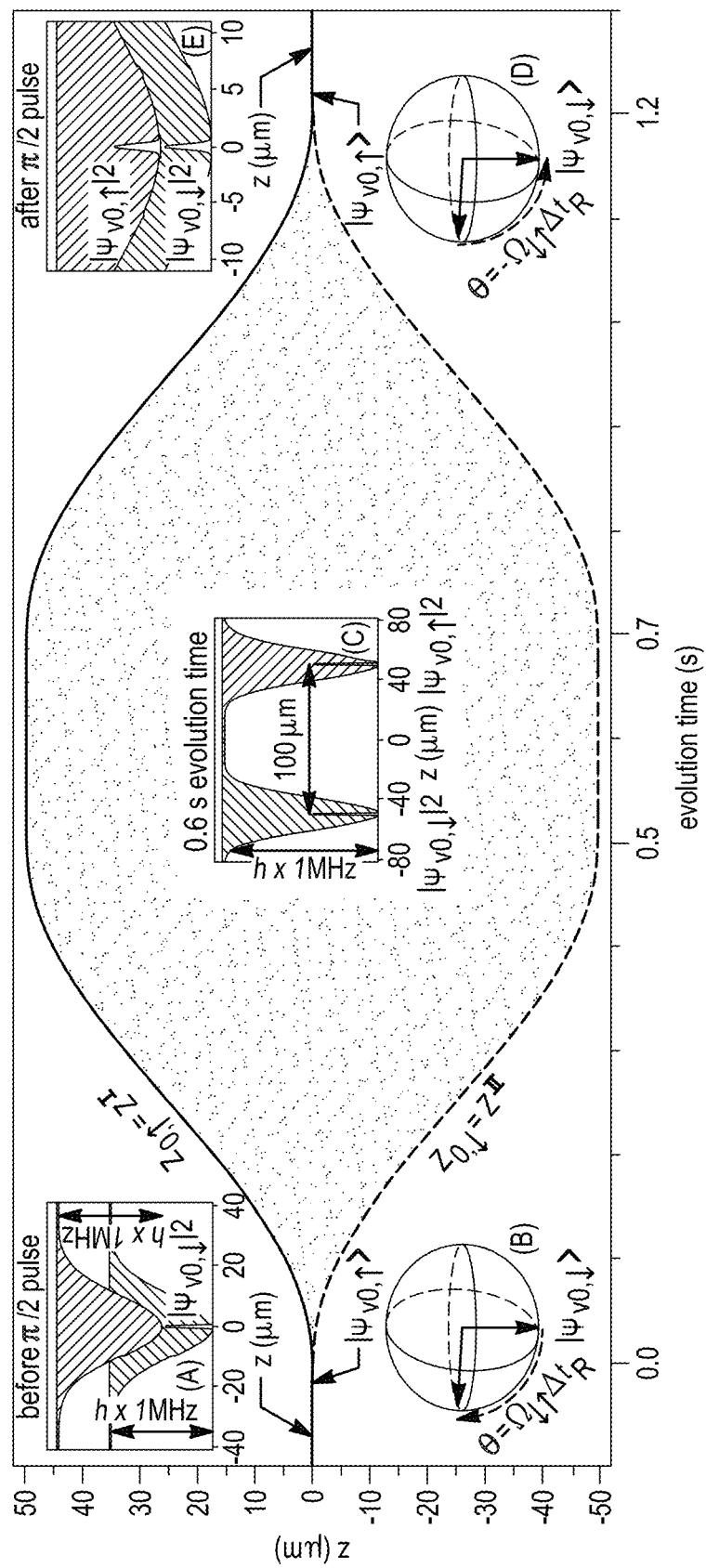
FIG. 3 illustrates an example of a spinor atom interferometer implementation in accordance with this disclosure.

The scalar and spinor implementations simulated and described above exhibit similar sensitivities to the acceleration a. The sensitivities are not the same because the cases happen to have slightly different AI areas (shaded regions in FIGS. 1 and 3). Assuming a phase resolution of $2\pi/100$, the acceleration sensitivity of the sequences in FIGS. 1 and 3 is on the order of several hundreds of microGals ($10^{-7}$ g), which is about a factor of 100 short of the level of modern gravimeters. TAI could reach that level by a ten-fold increase of the interferometer time, $T_1=t_b-t_a$ (on the order of 1 s in FIGS. 1 and 3), and a ten-fold increase of the spatial separation between the tractor potential wells.

A reduction of the grid spacing $\Delta z$ in the simulation does not noticeably affect the accuracy of the results; whereas, a reduction of the time-step size $\Delta t$ does improve the agreement of $\Delta\phi_S$ with $\Delta\phi_Q$. Therefore the minor differences between quantum and semiclassical phases [too small to be seen in FIGS. 2(a) and 2(b)] is attributable mostly to the finite step size, $\Delta t$=10 ns, in the CN simulation. The step-size parameters chosen in this disclosure reflect a tradeoff between accuracy of $\Delta\phi_Q$ and simulation time needed.

Scalar TAI generally is more susceptible to nonadiabatic COM excitations in the splitters and recombiners than spinor TAI, necessitating longer splitter—and recombiner durations with reduced slopes $|\dot{z}_0|$ near the critical time points when the single well splits into two and vice versa (see FIG. 1). This entails a longer overall AI sequence, a reduced reading bandwidth, and additional susceptibilities to noise (such as vibrations) during the splitting and recombination. These shortcomings are naturally avoided in spinor TAI, where the tractor potentials do not soften at the splitting and recombination times.

Figure 4:
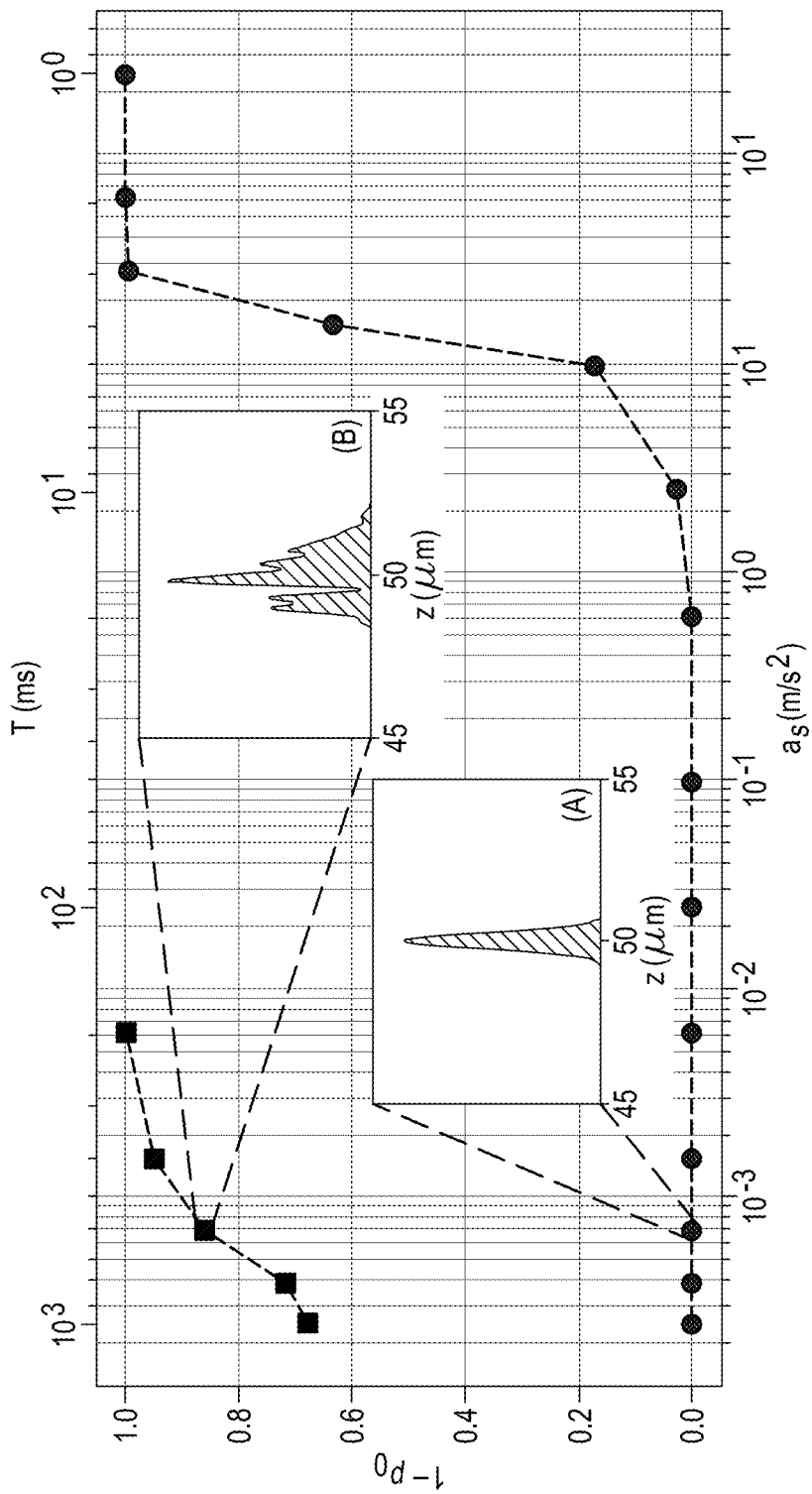
FIG. 4 is a graph showing nonadiabaticity vs. splitting duration (top axis) and peak tractor acceleration as (bottom axis) for a tractor control function given for scalar (squares) and spinor (circles) atom interferometry.

To quantify the nonadiabaticity in both TAI cases, a series of simulations of splitting sequences with smooth tractor control functions $z_0(t)=50$ µm×$\sin^2[\pi t/(2T)]$ (as in FIG. 3) for a range of splitter durations T and acceleration a=0 are run. The nonadiabaticity is given by $1-P_0(T)$, where $P_0$ is the COM ground-state probability after the splitting. In FIG. 4, plot $1-P_0(T)$ vs T and the peak value, $$a_S = 25\mu m\left(\frac{\pi}{T}\right)^2,$$

of the splitter acceleration $|\ddot{z}_0|$ for both TAI cases. The wave-function densities in the inset visualize the contrast between adiabatic [inset (A), no COM excitation] and nonadiabatic splitting [inset (B), substantial COM excitation]. The results underscore that for scalar TAI it is crucial to reduce the slope $|\ddot{z}_0|$ at the times when the wells split and recombine. For the control-function type used in FIG. 4, spinor TAI allows for rapid splitting, T~10 ms, while scalar TAI requires splitter times T~1 s.

For Sagnac rotation interferometry, the tractor paths can be programmed to circumscribe a nonzero geometric area A, and the paths can be traversed N times between splitting and recombination. For a sensitivity estimate for the angular rotation rate $\Omega$, assume TAI loop parameters of A=1 cm$^2$ and N=300, which seems feasible. For rubidium it then is $\Delta\phi/\Omega$~mA//$\hbar \approx 4\times 10^7$ rad/(rad/s). Assuming a phase resolution $\Delta\phi=2\pi/100$, the rotation sensitivity would be ~1 nrad/s.

Figure 5:
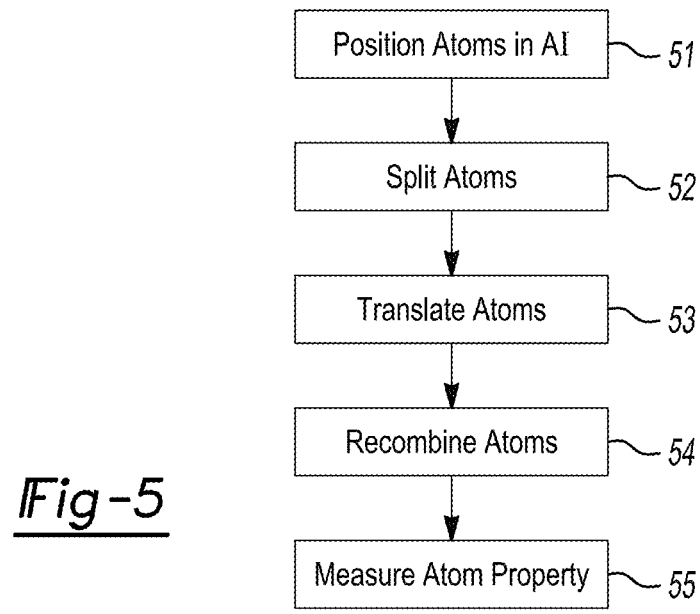
FIG. 5 illustrates a technique for measuring motion of a moving body using tractor atom interferometer.
Figure 8:
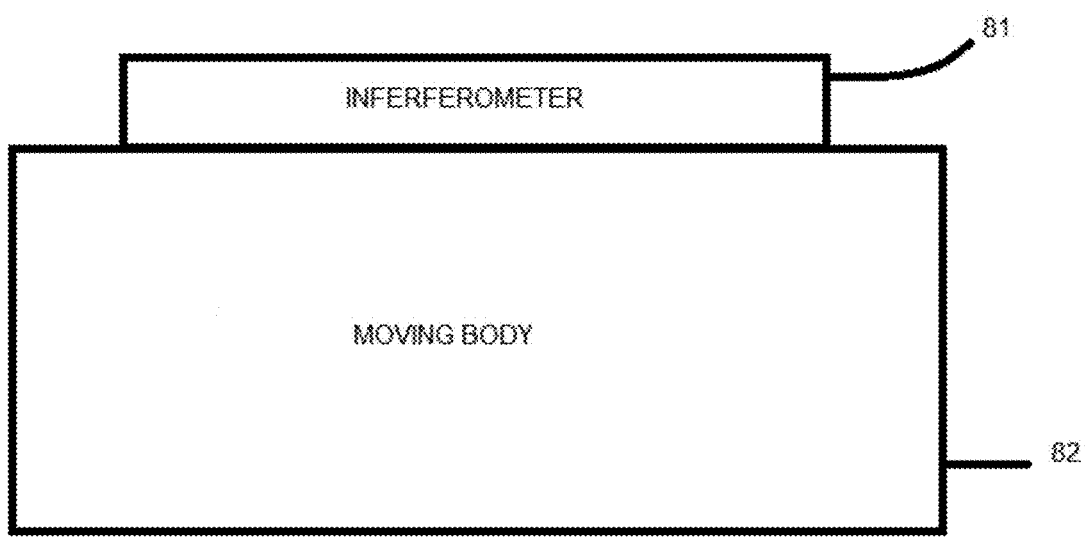
FIG. 8 shows an interferometer attached to a moving body.

FIG. 5 illustrates this technique for measuring motion of a moving body using the tractor atom interferometer described above. This technique can be generalized to use at least one atom, where the at least one atom is positioned in a cavity of an atom interferometer as indicated at 51, for example using an optical potential trap. The atom interferometer 81 is preferably attached to a moving body 82 as shown in FIG. 8. While described in terms of one atom, it is readily appreciated that measurement precision is improved by using a plurality of atoms (e.g., hundreds to hundreds of thousands of atoms).

During the measurement process, the at least one atom is split into a pair of wave-function components at 52 by a beam splitter, for example using microwave pulses. The pair of wave-function components are then guided at 53 along respective paths in the cavity such that the pair of wave-function components are confined spatially along the respective paths in all degrees of freedom and without interruption. In one example, the wave-function components are moved by shifting phase of at least two laser beams injected into the cavity, thereby enabling programmed position control of the optical potential trap. The pair of wave-function components are coherently recombined at 54 to reform the at least one atom. The pair of wave-function components can be recombined by moving the wave-function components into overlapping positions and hitting them with microwave pulses.

After the pair of wave-function components have been recombined, a property of the reformed atom is measured at 55, where the property of the atom is indicative of motion of the moving body. In one example, the spin states of the atom can be measured and used to calculate the acceleration or rotation of the moving body. Different techniques for measuring an atom property and calculating a metric indicative of the motion of the moving body are known and contemplated for use by this disclosure.

Figure 6A:
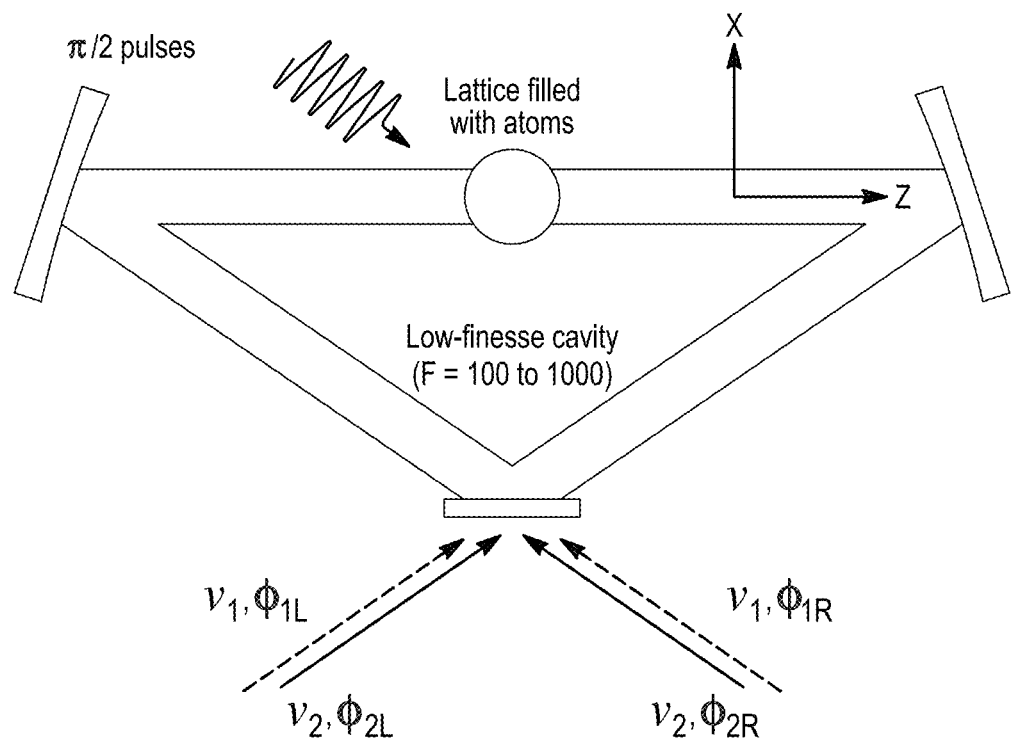
FIGS. 6A and 6B depict a first example embodiment for the tractor atom interferometer.
Figure 6B:
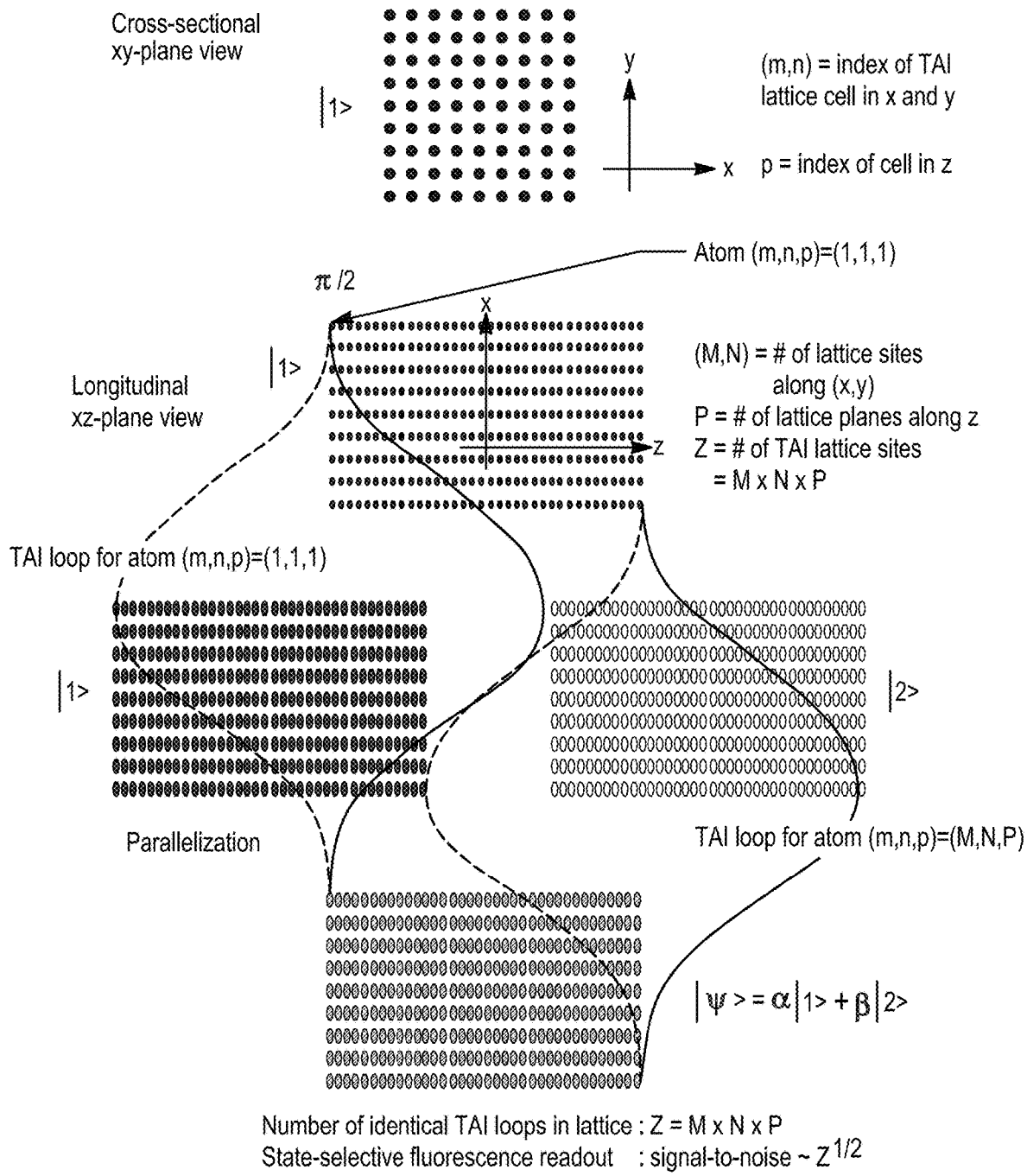

FIGS. 6A and 6B depict a first example embodiment for the tractor atom interferometer. In this embodiment, the cavity of the atom interferometer is formed by three mirrors 61, 62 and 63. Numerous atoms (e.g., Rb-87) are placed into the cavity to achieve high signal-to-noise ratio. The atoms are positioned in the cavity using optical potential traps. More specifically, the atoms are positioned using an optical lattice formed by two laser beams. Splitting and recombining functions are achieved using microwave pulses or Raman pulses. The atoms can be translated along a primary mode direction (optical axis) of the light field in the cavity by adjusting phase of the two laser beams using spatial light modulators or equivalent electro-optic devices. This embodiment addresses primarily Mach-Zehnder-style acceleration sensing.

In one example, optical lattices are formed in the cavity with a resonant field modes, thereby providing an optical lattice for each of the basis spin states of the atom. Although not limited to two, two atomic spin states are locked to a pair of distinct clockwise and counter-clockwise cavity modes with frequencies differing by an amount in the RF regime (e.g., MHz to 10 GHz) matched to the atomic spin states with each of the modes pumped by its own pair of lasers. The positions of the lattice sites of the counter-clockwise and clockwise propagating cavity modes along the cavity optical axis are controlled by differential phase or frequency control of the respective laser beam pairs pumping the modes, using combinations of electro-optic modulators and spatial light modulators.

With reference to FIG. 6B, the lattice sites define a grid of atom traps in each plane transverse to the optical axis via matching the pump laser modes with a higher-order Hermite-Gaussian mode of the cavity, HG_MN, using a combination of electro-optic modulators and spatial light modulators. The Hermite-Gaussian mode provides M times N atom traps in each of the atom-filled lattice planes transverse to the optical axis, whose number is defined as P, resulting in a number of Z=M×N×P atom traps, defined by an equivalent set of Z=M×N×P optical lattice sites. It is noted that all of the sites need to be occupied with atoms. For this example, each atom in its own trap is split into wave-function components in two spin states using a first set of auxiliary electro-magnetic field pulses, then the two components are translated in opposite directions via longitudinal translation of the spin-specific lattice modes by controlling differential phase or frequency control of the respective laser beam pairs pumping the modes, and then overlapped in space by reversing the cavity-controlled longitudinal motion of the wave-function components and recombined using a second set of auxiliary electro-magnetic field pulses. The state of the up to Z=M×N×P atoms can be read out using a spin-dependent atomic probe, such as state-dependent laser fluorescence or optical phase shift, with the signal-to-noise scaling as $Z^{(1/2)}$ due to quantum projection noise.

Figure 7A:
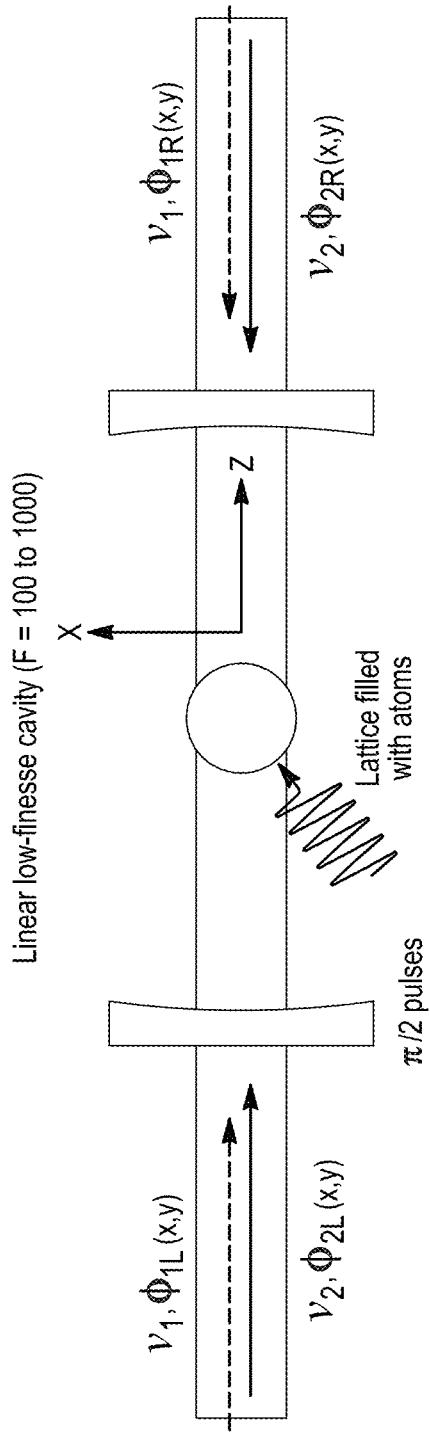

FIGS. 7A and 7B depict a second example embodiment for the tractor atom interferometer. In this embodiment, the cavity of the atom interferometer is formed by two mirrors 71, 72. Again, numerous atoms (e.g., Rb-87 atoms) are positioned into the cavity using an optical lattice formed by two laser beams. In this case, the atomic wave-function components are translated on circular trajectories in planes transverse to the primary mode direction of the light filed in the cavity. This embodiment addresses primarily Sagnac-style rotation sensing.

In one example, two optical lattices for the two atomic spin states are locked to a pair of bidirectional cavity modes with frequencies differing by an amount in the RF regime (e.g., MHz to 10 GHz) matched to the atomic spin states, with each of the modes pumped by a respective pair of laser beams. The position of the lattice sites along the cavity optical axis is fixed, while the lattice sites of the two spin-specific cavity modes are counter-rotated on planes transverse to the optical axis of the cavity by a differential angle of an integer times 2 π, controlled by rotating the mode-matching patterns of the pump beams in counter-rotating, clockwise and counter-clockwise, fashions using spatial light modulators and electro-optic components.

With reference to FIG. 7B, the optical lattice defines a grid of atom traps in the plane transverse to the optical axis via matching the pump laser modes with a higher-order Hermite-Gaussian mode of the cavity, HG_MN, using a combination of electro-optic modulators and spatial light modulators. The Hermite-Gaussian mode provides M times N atom traps in each of the atom-filled lattice planes transverse to the optical axis, whose number is defined as P, resulting in a number of Z=M×N×P atom traps, defined by an equivalent set of Z=M×N×P lattice sites. It is noted that not all of the sites need to be occupied with atoms. For this example, each atom in its own optical-lattice trap is split into wave-function components in two spin states using a first set of auxiliary electro-magnetic field pulses, then the two components are counter-rotated in opposite azimuthal directions about the cavity optical axis, cw and ccw, by rotating the spin-specific lattice modes, and then overlapped in space by reversing the cavity-controlled azimuthal cw and ccw rotations of the lattice modes about the cavity optical axis, thereby re-overlapping the wave-function components trapped in the lattice sites, before finally recombined by a second set of auxiliary electro-magnetic field pulses. The state of the up to Z=M×N×P atoms is read out using a spin-dependent atomic probe, such as state-dependent laser fluorescence or optical phase shift, with the signal-to-noise scaling as $Z^{(1/2)}$ due to quantum projection noise.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for measuring motion of a moving body using an atom interferometer, comprising:
   positioning at least one atom in a cavity of the atom interferometer, where the atom interferometer is attached to the moving body;
   splitting the at least one atom into a pair of wave-function components;
   guiding the pair of wave-function components along respective paths in the cavity such that the pair of wave-function components are confined spatially along the respective paths in all degrees of freedom and without interruption;
   coherently recombining the pair of wave-function components into the at least one atom; and
   measuring a property of the at least one atom after the pair of wave-function components have been recombined into the at least one atom, where the property of the at least one atom is indicative of motion of the moving body.

2. The method of claim 1 further comprises positioning the at least one atom using an optical potential trap and moving the pair of wave-function components along the respective paths using the optical potential trap.

3. The method of claim 2 further comprises splitting the at least one atom into a pair of wave-function components using pulsed microwaves or Raman laser pulses and coherently recombining the pair of wave-function components into the at least one atom using pulsed microwaves or Raman laser pulses.

4. The method of claim 1 wherein the at least one atom is further defined as rubidium-87.

5. The method of claim 1 further comprises measuring atomic spin states of the at least one atom and calculating acceleration of the moving body from the atomic spin state of the at least one atom.

6. A method for measuring motion of a moving body using an atom interferometer, comprising:
   positioning a plurality of atoms in a cavity of the atom interferometer, where the atom interferometer is attached to the moving body;
   for each atom in the plurality of atoms, splitting a given atom into a pair of wave-function components, guiding the pair of wave-function components along respective paths in the cavity such that the pair of wave-function components are confined spatially along the respective paths in all degrees of freedom and without interruption, and coherently recombining the pair of wave-function components to reform the given atom; and
   measuring a property of the plurality of atoms after the atoms have been recombined, where the property of the at least one atom is indicative of motion of the moving body.

7. The method of claim 6 further comprises positioning the plurality of atoms using an optical potential trap and moving the pairs of wave-function components along the respective paths using the optical potential trap.

8. The method of claim 7 further comprises splitting the plurality of atoms into multiple pairs of wave-function components using pulsed microwaves or Raman laser pulses and coherently recombining the pairs of wave-function components into the plurality of atoms using pulsed microwaves or Raman laser pulses.

9. The method of claim 6 wherein the plurality of atoms are rubidium-87.

10. The method of claim 6 further comprises measuring atomic spin states of the at least one atom and calculating acceleration of the moving body from the atomic spin state of the at least one atom.

* * * * *